Apr. 17, 1923.

W. A. READY

PRESSURE GAUGE

Filed Jan. 10, 1921

1,452,126

Inventor:
William A. Ready,
by his attorney,
Charles S. Gooding.

Patented Apr. 17, 1923.

1,452,126

UNITED STATES PATENT OFFICE.

WILLIAM A. READY, OF BROOKLINE, MASSACHUSETTS, ASSIGNOR TO NATIONAL COMPANY, OF CAMBRIDGE, MASSACHUSETTS, A CORPORATION OF MASSACHUSETTS.

PRESSURE GAUGE.

Application filed January 10, 1921. Serial No. 436,160.

*To all whom it may concern:*

Be it known that I, WILLIAM A. READY, a citizen of the United States, residing at Brookline, in the county of Norfolk and State of Massachusetts, have invented new and useful Improvements in Pressure Gauges, of which the following is a specification.

This invention relates to a gauge adapted to be used for indicating pressures at different portions of a furnace having a forced draft.

The object of the invention is to provide a gauge of the character set forth which can be clearly and easily read and in which the scale, by means of which the different pressures are to be determined, will not be soiled and rendered difficult of observation by reason of the locality in which the gauge is placed. Gauges of this character are usually placed in boiler rooms and soon become covered with smoke and soot and are very difficult to read.

Another object of the invention is to provide a gauge in which there are no stuffing boxes or cemented joints exposed to liquid pressure.

A further object of the invention is to provide a multiple gauge in which any gauge tube may be removed without interfering with the operation of the other units.

In the gauge of this invention the gauge tube is immersed in liquid contained in a receptacle, the upper end of the tube being adapted to be connected to a source of pressure and the lower end of the tube being left free and open, so that there is no tendency to crack the gauge tube due to unequal expansion between the glass of the tube and the metal which supports it.

The scale which is used in connection with the gauge tube is made adjustable to compensate for evaporation of liquid in the chamber or container. In order to render the device easily and clearly readable an indicator is provided adjacent to the scale and which is adjustable so as to indicate the normal pressure.

Further advantages secured by the construction of the device of this invention are that the receptacle for the liquid is dust-tight and easily taken apart to be cleaned and the condition and level of the liquid in the container are always in plain sight.

To these ends the invention consists in the combination and arrangement of parts set forth in the following specification and particularly pointed out in the claims.

Referring to the drawings.

Like numerals refer to like parts throughout the several views of the drawings.

Figures 1, 2, 3:
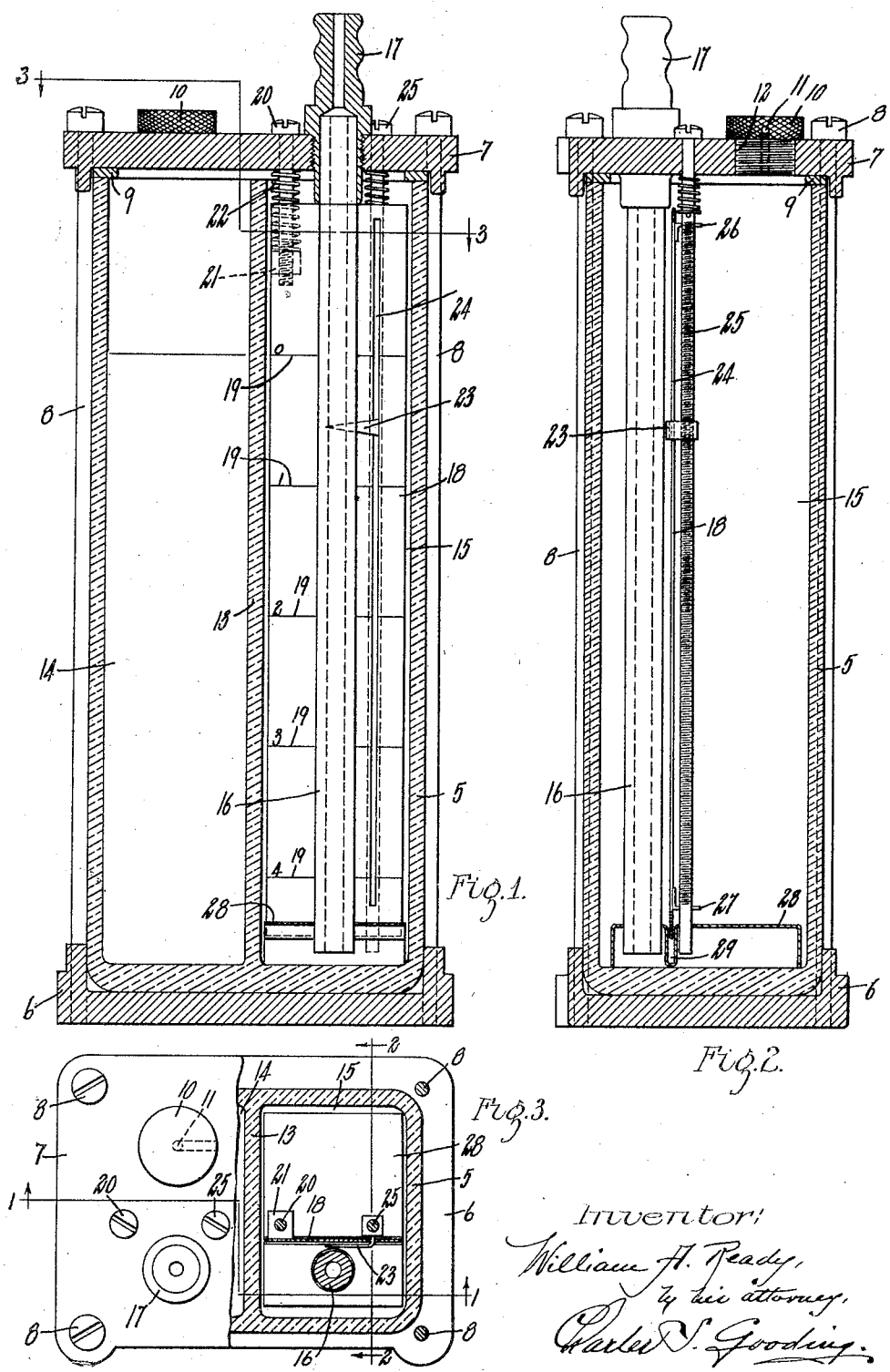
Figure 1 is a vertical sectional elevation of my improved gauge taken on line 1—1, Fig. 3.
Fig. 2 is a sectional elevation taken on line 2—2, Fig. 3.
Fig. 3 is a sectional plan taken on line 3—3, Figure 1.

In the drawings, 5 is a container made of transparent material and preferably rectangular in cross section. Said container is clamped between a bottom member 6 and a top member 7 by rods 8, a gasket 9 being interposed between the open top of the container 5 and the top member 7. The top member 7 is provided with a plug 10 having a vent 11 extending upwardly from the bottom thereof and outwardly at one side as illustrated in Fig. 2. The aperture 12 in the top 7, which is closed by the plug 10, is utilized when it is desired to place liquid in the container 5. The container 5 is provided with a partition 13 which divides the same into two chambers 14 and 15. In each of the chambers 14 and 15 there is a glass tube 16 which is open at the bottom and terminates at a short distance from the bottom of the container 5. The upper end of the tube 16 projects into and is fastened to a nipple 17 which has screw-threaded engagement with the top member 7 and is adapted to be connected by a hose or tube to any desired part of a forced draft system whereby pressure from such part of the system may be conveyed into the tube 16. A scale 18 consisting of a flat piece of metal provided with graduations 19 is located immediately adjacent to and in the rear of the tube 16, said scale is adjusted upwardly and downwardly by means of a screw 20 which extends through the top 7 and has screw-threaded engagement with an ear 21 provided on the rear face of the scale 18. A spring 22 is interposed between the ear 21 and the top 7 so that by rotating the screw 20 in one direction or the other the scale 18 may be raised and lowered to compensate for evaporation of liquid in the chamber. An indicator 23 is located between the gauge tube 16 and the scale 18 and projects through a slot 24 to the rear side of the scale 18 where it is engaged by a vertical screw 25 which projects through the top 7 and also projects through a pair of brackets 26 and 27 which are fastened to the top and bottom respectively of the scale 18.

A positioning plate 28 is provided in the bottom of each of the chambers 14 and 15 and the gauge tube 16 and screw 25 project through this positioning plate at their lower ends. Said positioning plate is further provided with a slot 29 which extends thereacross and receives the lower end of the scale 18. The positioning plate is loosely mounted in the bottom of the container, so that while it positions the lower ends of the tube 16, screw 25 and scale 18 approximately, it does not rigidly position the lower ends of these members so that a variation in position of the tube 16, due to a difference in expansion and contraction of the metal top 7 and the glass container 5, will not result in cracking the tube 16. Moreover, it is very easy to remove the tube 16 by unscrewing the nipple 17 without disturbing any of the other parts of the gauge and also it will be understood that if it is desired to clean out the container 5, the top 7 can be removed by unscrewing the rods 8, taking off the cover and with the cover removing the gauge tubes 16, the screws 25 and the scales 18.

In the foregoing description of my invention the gauge is illustrated as comprising two units. When using this form, one unit could be connected by means of a tube to a compartment below the damper of a furnace, while the second unit would be connected to the draft compartment of said furnace beneath the stoker, the gauge suitably calibrated would then indicate pressure above or below atmospheric pressure in these two compartments and would assist the fireman in the proper and efficient operation of the boiler.

It will be understood that while I have described and illustrated my invention as a two-unit gauge, I do not wish to be confined to a gauge with two units. I may use any number of units desired.

The general operation of my invention hereinbefore specifically described is as follows: Assuming the parts of the gauge to be assembled in the relative positions illustrated in the drawings and oil of a non-volatile nature contained in the chambers 14 and 15 and the gauge tube 16 at substantially the height of the zero mark on the scale. The nipples 17 of the two chambers 14 and 15 are connected by tubes respectively to the compartment below the damper of the furnace, and to the draft compartment of the furnace. Under these conditions, assuming that there is a fire in the furnace and that the blower is in operation the pressure in the blower or draft compartment will be communicated to the gauge tube 16 in the chamber 15 and the level of the liquid in said tube 16 will fall to a certain position on the scale, say to the line 2. This will denote that there is a pressure equal to two inches of water in the draft compartment, on the other hand, there being a suction in the stoker or compartment below the damper the liquid in the gauge 16, which is located in the chamber 14 and is connected to said stoker will show a rise above the zero point denoting that there is a slight vacuum in this compartment, which measured on the scale would amount to a certain number of inches of water pressure. By trial it may be determined the best levels at which to maintain these pressures in order to get the most efficient operation and when this has been determined the indicators are set at these levels in their respective chambers and the fireman or operator instructed to keep the draft and pressure at these levels.

I claim:

1. A gauge having, in combination, a container for liquid, a vertical tube of transparent material located in said container and open at its opposite ends, the lower end of said tube terminating adjacent to the bottom of said container and spaced apart therefrom, means to connect the upper end of said tube to a source of pressure and a vertical scale wholly within said container adjacent to said tube.

2. A gauge having, in combination, a container for liquid, a vertical tube of transparent material located in said container and open at its opposite ends, the lower end of said tube terminating adjacent to the bottom of said container and spaced apart therefrom, means to connect the upper end of said tube to a source of pressure, a vertical scale wholly within said container adjacent to said tube and means operable from the exterior of said container to raise and lower said scale.

3. A gauge having, in combination, a container for liquid, a vertical tube of transparent material located in said container and open at its opposite ends, the lower end of said tube terminating adjacent to the bottom of said container and spaced apart therefrom, means to connect the upper end of said tube to a source of pressure, a vertical scale wholly within said container adjacent to said tube, and a screw projecting through the top of said container and engaging said scale, whereby the latter may be raised and lowered.

4. A gauge having, in combination, a container for liquid, a vertical tube of transparent material located in said container and open at its opposite ends, the lower end of said tube terminating adjacent to the bottom of said container and spaced apart therefrom, means to connect the upper end of said tube to a source of pressure, a vertical scale wholly within said container adjacent to said tube, a screw projecting through the top of said container and having screw-threaded engagement with said scale and a spring interposed between the latter and said container, whereby said scale may be raised and lowered.

5. A gauge having, in combination, a container for liquid, a vertical tube of transparent material located in said container and open at its opposite ends, the lower end of said tube terminating adjacent to the bottom of said container and spaced apart therefrom, means to connect the upper end of said tube to a source of pressure, a vertical scale wholly within said container adjacent to said tube, an indicator within said container and adjacent to the front face of said scale and means to raise and lower said indicator.

6. A gauge having, in combination, a container for liquid, a vertical tube of transparent material located in said container and open at its opposite ends, the lower end of said tube terminating adjacent to the bottom of said container and spaced apart therefrom, means to connect the upper end of said tube to a source of pressure, a vertical scale wholly within said container adjacent to said tube, an indicator within said container and adjacent to the front face of said scale, and a vertical screw operable from the exterior of said container and having screw-threaded engagement with said indicator, whereby said indicator may be raised and lowered.

7. A gauge having, in combination, a container for liquid, a vertical tube of transparent material located in said container and open at its opposite ends, the lower end of said tube terminating adjacent to the bottom of said container and spaced apart therefrom, means to connect the upper end of said tube to a source of pressure, a vertical scale in said container adjacent to said tube, an indicator located adjacent to the front face of said scale and projecting rearwardly through a slot provided in the latter, a screw operable from the exterior of said container, and a pair of brackets fast to the top and bottom of said scale on the rear face thereof through which said screw projects, said screw having screw-threaded engagement with said indicator, whereby said indicator may be raised and lowered.

8. A gauge having, in combination, a container for liquid, a vertical tube of transparent material located in said container and open at its opposite ends, the lower end of said tube terminating adjacent to the bottom of said container and spaced apart therefrom, means to connect the upper end of said tube to a source of pressure, a vertical scale in said container adjacent to said tube, an indicator located adjacent to the front face of said scale and projecting rearwardly through a slot provided in the latter, a screw operable from the exterior of said container, a pair of brackets fast to the top and bottom of said scale on the rear face thereof through which said screw projects, said screw having screw-threaded engagement with said indicator, and a spring encircling said screw and interposed therebetween and the top of said container, whereby said indicator may be raised and lowered.

9. A gauge having, in combination, a container for liquid, a vertical tube of transparent material located in said container and open at its opposite ends, the lower end of said tube terminating adjacent to the bottom of said container and spaced apart therefrom, means to connect the upper end of said tube to a source of pressure and a positioning plate loosely mounted at the bottom of said container through which the lower end of said vertical tube projects.

10. A gauge having, in combination, a container for liquid, a vertical tube of transparent material located in said container and open at its opposite ends, the lower end of said tube terminating adjacent to the bottom of said container and spaced apart therefrom, means to connect the upper end of said tube to a source of pressure, a vertical scale in said container adjacent to said tube and a positioning plate through which the lower end of said tube projects, said positioning plate being provided with a slot extending thereacross into which slot the lower end of said scale projects.

In testimony whereof I have hereunto set my hand in presence of two subscribing witnesses.

WILLIAM A. READY.

Witnesses:
FRANKLIN E. LOW,
KATHYRN M. JOYCE.